United States Patent

[11] 3,556,551

[72] Inventors John B. Shaw
 1812 E. Marlette, Phoenix, Ariz. 85016;
 William H. Schwartz, 260 Summit Drive,
 Corte Madera, Calif. 94925
[21] Appl. No. 789,905
[22] Filed Jan. 8, 1969
[45] Patented Jan. 19, 1971

[54] SUSPENSION SYSTEM
 8 Claims, 6 Drawing Figs.
[52] U.S. Cl. .................................................. 280/104.5,
 280/81
[51] Int. Cl. .................................................. B60g 5/00
[50] Field of Search .......................................... 280/81,
 104.5, 124F

[56] References Cited
UNITED STATES PATENTS
2,395,640 2/1946 Pearson...................... 280/81

Primary Examiner—Philip Goodman
Attorney—Mellin, Moore & Weissenberger

ABSTRACT: Disclosed herein is a suspension system incorporating three in-line wheels for supporting one side of a vehicle. Each end wheel is connected to and cooperates with a hydraulic cylinder. The middle wheel is connected to and cooperates with a pair of hydraulic cylinders. A tubular line connects the hydraulic cylinder of one end wheel with one of the hydraulic cylinders of the middle wheel, and a tubular line connects the hydraulic cylinder of the other end wheel with the other hydraulic cylinder of the middle wheel.

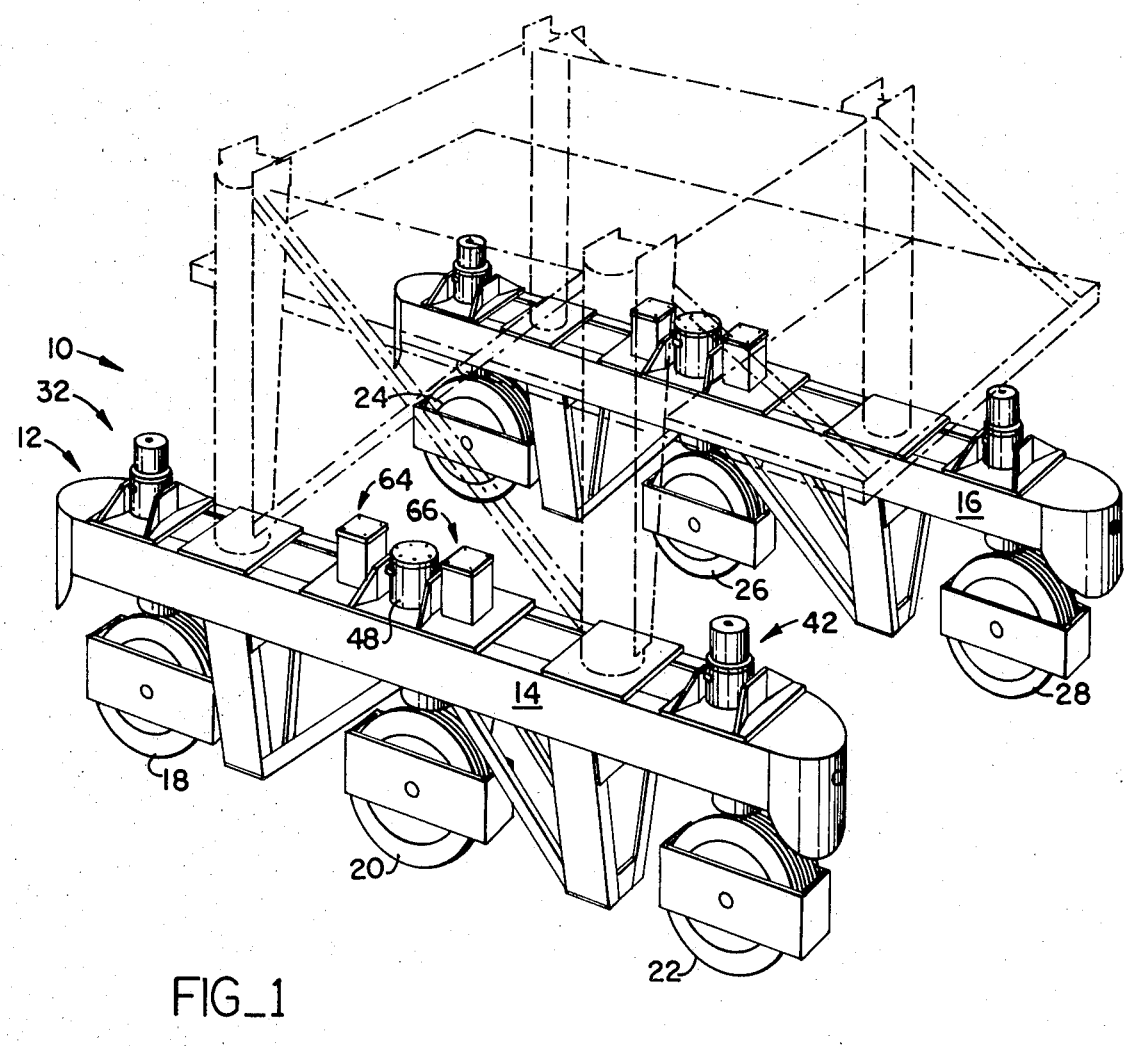
FIG_1

PATENTED JAN 19 1971
3,556,551
SHEET 2 OF 3
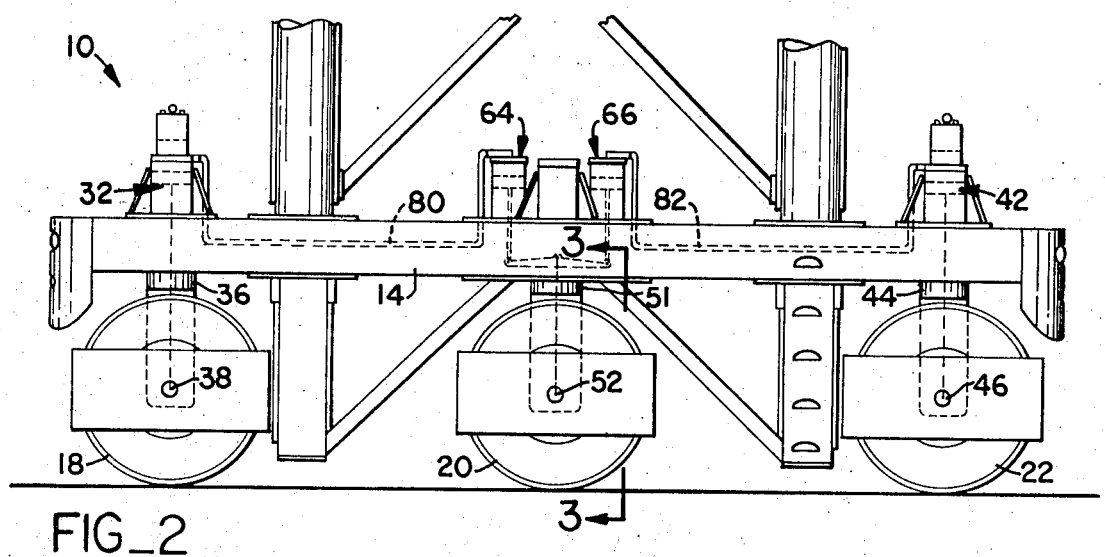
FIG_2
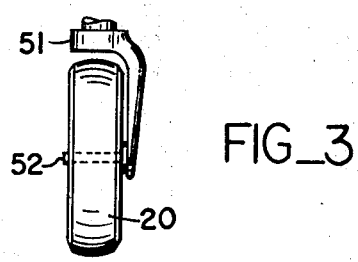
FIG_3
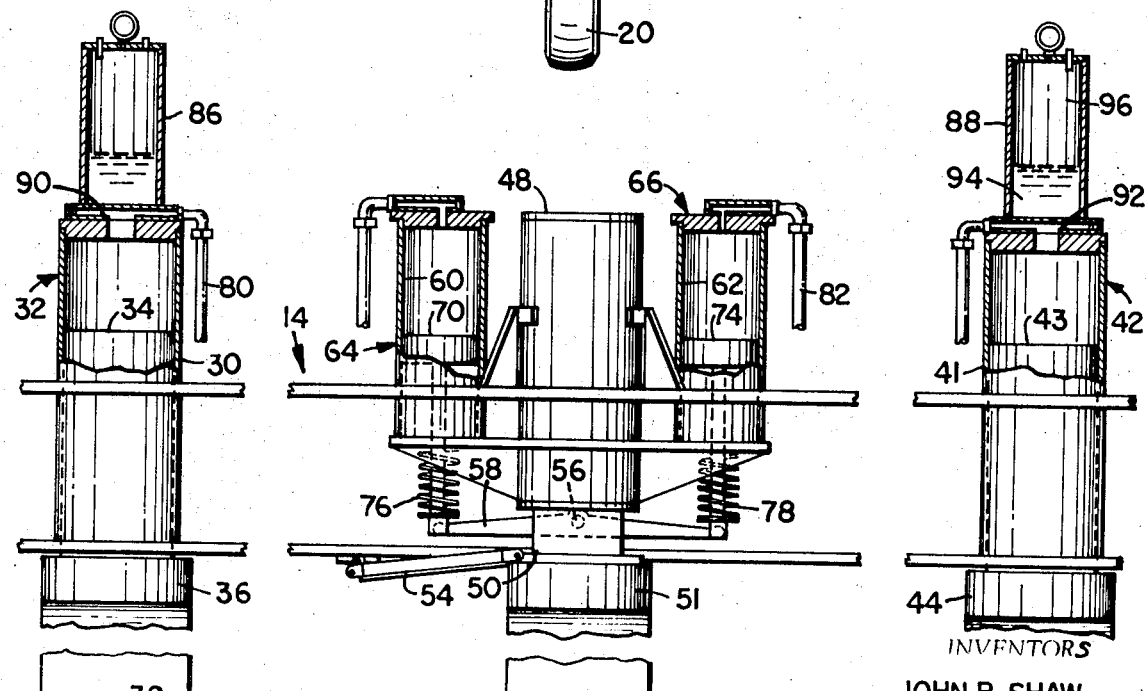
FIG_4
INVENTORS
JOHN B. SHAW
BY WILLIAM H. SCHWARTZ
ATTORNEYS

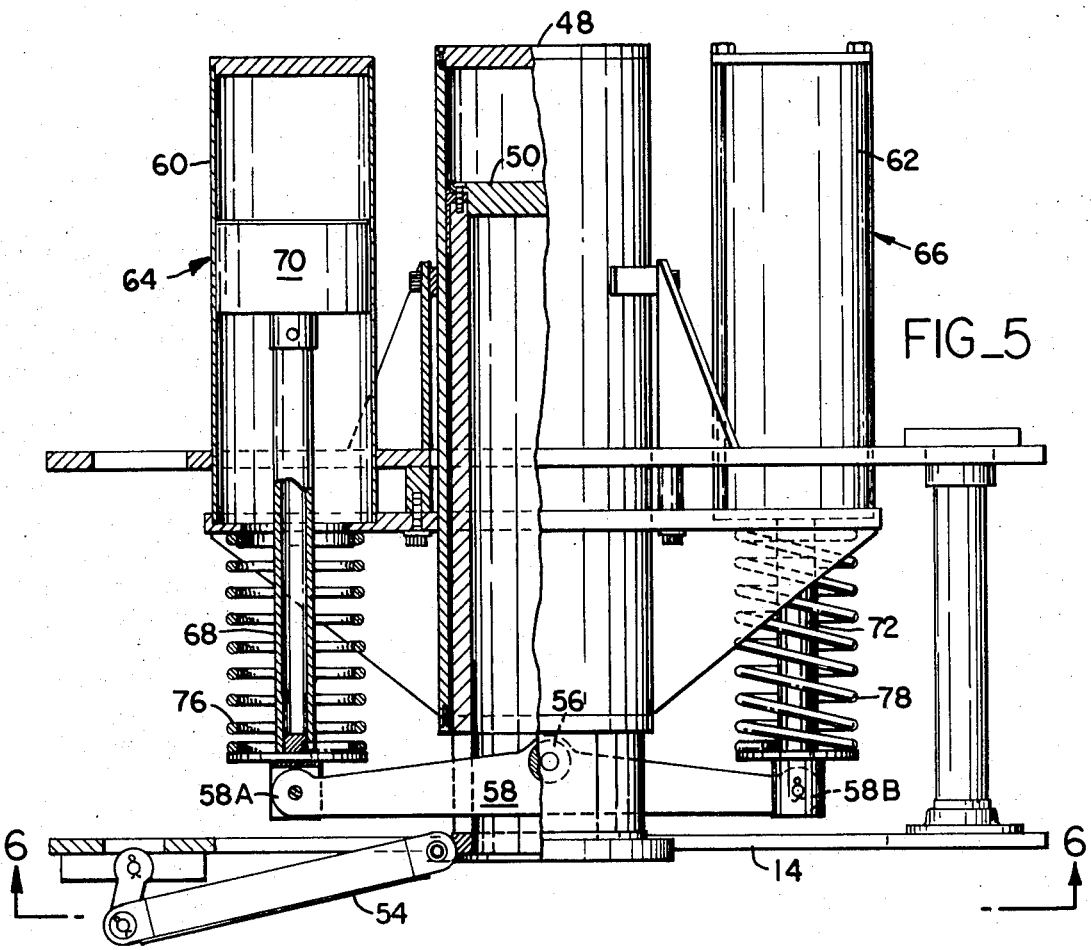
FIG_5
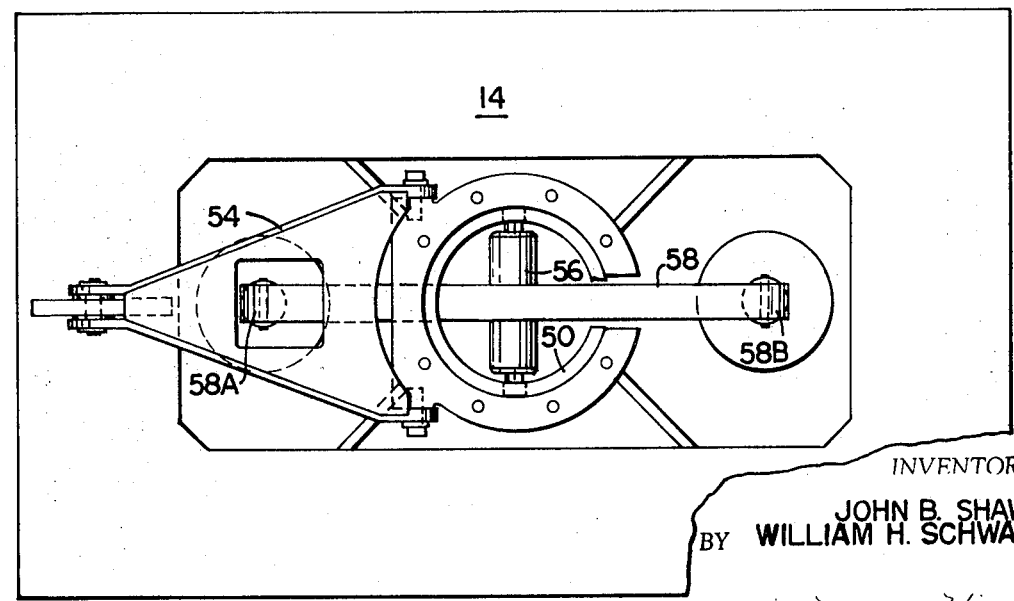
FIG_6
INVENTORS
JOHN B. SHAW
BY WILLIAM H. SCHWARTZ
ATTORNEYS 3,556,551

SUSPENSION SYSTEM

BACKGROUND OF THE INVENTION

This invention relates to a vehicle suspension system, and more particularly to a suspension system which incorporates a load-equalizing apparatus.

In the prior art, various devices are known which incorporate a load-equalizing or stabilizing mechanism through which two or more wheels of a vehicle interact. See, for example, U.S. Pat. Nos. 3,195,917 (Baldock), 1,747,902 (Marcum), 3,239,236 (Flowers), 2,381,425 (Deal et al.), 3,134,606 (Oyler), and 2,691,420 (Fox et al.). In such devices, the wheels along one side of the vehicle interact to stabilize that side of the vehicle and/or equalize the load over those wheels.

It will be noted that the patents to Baldock, Marcum, Flowers, Deal et al. and Fox et al. each teach a two-wheeled system, with interaction therebetween, in some cases by hydraulic means (Baldock, Flowers, Deal et al.), and in some cases by pneumatic means (Marcum, Fox et al.). Nowhere is there a teaching of how to tie in the wheels of a three- (or more-) wheeled system by hydraulic or pneumatic means so that stability and/or load equalizing between these wheels is achieved. It would be obvious, of course, to add wheels to any of the vehicles of these patents. But there is no teaching of how proper load equalizing could be achieved when these wheels are so added.

The patent to Oyler discloses a system which causes stabilizing between three wheels on one side of a vehicle. But that system is purely mechanical, involving long leaf springs and chains interconnecting them. Such a system can only be applied, of course, when the structure of the vehicle allows room for it. As is well known, often the configuration of the structure will not allow it, and it would therefore be advantageous to provide a hydraulic system (wherein hydraulic lines can be bent and configured to fit the vehicle structure) in its place.

It is therefore the object of this invention to provide a hydraulic suspension system for a vehicle which provides load equalization over three wheels along one side of the vehicle.

It is a further object of this invention to provide a system which, while fulfilling the above object, provides proper springing action and shock absorption for the vehicle.

It is a still further object of the invention to provide a system which, while fulfilling the above objects, is as simple and maintenance-free as possible.

SUMMARY OF THE INVENTION

Broadly stated, the inventive suspension system is associated with the frame of a vehicle for supporting one side of the frame above the ground and comprises first, second and third wheels associated with the frame, the axles of the wheels being movable relative to the frame along lines substantially perpendicular to the ground. A first hydraulic cylinder has its body fixed relative to the frame above the axle of the first wheel and its piston fixed relative to the axle of the first wheel to move therewith. A second hydraulic cylinder has its body fixed relative to the frame above the axle of the third wheel and its piston fixed relative to the axle of the third wheel to move therewith. A linkage bar has its center portion pivotally fixed relative to and above the axle of the second wheel. A third hydraulic cylinder has its body fixed relative to the frame and above one end of the linkage bar, and its piston rod pivotally fixed relative to that one end of the linkage bar. A fourth hydraulic cylinder has its body fixed relative to the frame and above the other end of the linkage bar, and its piston rod pivotally fixed relative to the other end of the linkage bar. A first tube interconnects the first and third hydraulic cylinders for the interchange of pressure therebetween, and a second tube interconnects the second and fourth hydraulic cylinders for the interchange of pressure therebetween.

BRIEF DESCRIPTION OF THE DRAWINGS

These and other objects of the invention will become apparent from a study of the following description and drawings, in which:

FIG. 1 is a perspective view, partly in phantom, of a vehicle which incorporates the inventive suspension system;

FIG. 2 is a side elevation of a portion of the vehicle of FIG. 1, showing the suspension system;

FIG. 3 is a view taken along the line 3–3 of FIG. 2;

FIG. 4 is a sectional view with portions removed, of the suspension system;

FIG. 5 is a side elevation partly broken away, of the portion of the suspension adjacent the center wheel of one side of the vehicle;

FIG. 6 is a view taken along the line 6–6 of FIG. 5.

DESCRIPTION OF THE PREFERRED EMBODIMENT

Generally shown in FIG. 1 is a vehicle 10. The vehicle 10 is shown as one which is adapted to lift and carry shipping containers, but it will be understood that the suspension system disclosed is adaptable to any vehicle. The vehicle 10 comprises a frame 12 which includes longitudinal subframe portions 14 and 16. The subframe portion 14 has equally spaced and aligned wheels 18, 20, 22 associated with it and the subframe portion 16 has equally spaced and aligned wheels 24, 26, 28 associated with it. The manner of association of the wheels 18, 20, 22 with the subframe portion 16 is best shown in FIGS. 2—6.

The tubular body 30 of a hydraulic cylinder 32 is fixed to the longitudinal subframe portion 14 at one end thereof. Disposed within the body 30 is a piston 34 which is fixed to a suspension arm 36 which in turn is fixed relative to axle 38 of wheel 18. By sliding the piston 34 up and down within the tubular body 30, the axle 38 of wheel 18, it will be seen, is movable up and down along a line substantially perpendicular to the ground 40 on which the vehicle 10 rides.

At the other end of the longitudinal subframe portion 14 is fixed the tubular body 41 of a hydraulic cylinder 42. Disposed within the body 41 is a piston 43 which is fixed to a suspension arm 44 which in turn is fixed relative to axle 46 of wheel 22. The axle 46 of wheel 22 is movable up and down along a line substantially perpendicular to the ground 40 by sliding piston 43 within tubular body 41, this motion being similar to the motion of axle 38 of wheel 18 previously described.

Mounted to the subframe portion 14 between the hydraulic cylinders 32, 42 and above the wheel 20 is a tubular guide 48. The guide 48 has slidably disposed therewithin a tubular member 50, the bottom portion of which is fixed to a suspension arm 51 in turn fixed relative to the axle 52 of the wheel 20. By sliding the tubular member 50 up and down within the guide 48, the axle 52 of wheel 20 is movable along a line substantially perpendicular to the ground 40. A pivotal connecting link 54 interconnecting the tubular member 50 and subframe portion 14 acts to keep these members in their proper relative positions.

As shown in FIG. 2, the suspension arm 36 acts as a connecting rod between piston 34 and axle 38, and the suspension arm 44 acts as a connecting rod between piston 43 and axle 46.

A pin 56 is fixed within the inner bore of tubular member 50. A linkage bar 58 has its center portion pivotally fixed about the pin 56 at a point above the axle 52 of the wheel 20, the tubular member 50 having openings to allow such pivoting. The tubular bodies 60, 62 of hydraulic cylinders 64, 66 are fixed to the longitudinal subframe portion 14 on either side of the tubular guide 48, and above the ends 58A, 58B of linkage bar 58. The piston rod 68 of hydraulic cylinder 64 is pivotally fixed at one end to the piston 70 thereof, and is pivotally fixed at its other end to the end 58A of linkage bar 58. The piston rod 72 of hydraulic cylinder 66 is pivotally fixed at one end to the piston 74 thereof, and is pivotally fixed at its other end to the end 58B of linkage bar 58. A spring member 76 is disposed between the end 58A of the linkage bar 58 and the bottom of body 60 of hydraulic cylinder 64. Similarly, a spring member 78 is disposed between the end 58B of the linkage bar 58 and the bottom of the body 66 of hydraulic cylinder 62.

As best shown in FIGS. 2 and 4, a hydraulic line or tube 80 interconnects the hydraulic cylinders 32 and 64. Similarly, a hydraulic line or tube 82 interconnects the hydraulic cylinders 66 and 42.

Disposed over the hydraulic cylinder 32 and communicating with the tube 80 is a reservoir 86. Disposed over the hydraulic cylinder 42 and communicating with the tube 82 is a reservoir 88. Restrictive orifices 90, 92 are included where these reservoirs 86, 88 communicate with the tubes 80, 82 respectively.

In operation, the hydraulic cylinders 32, 64, 66, 42, tubes 80, 82, and reservoir 86, 88 are filled with hydraulic fluid 94 while the pistons of these cylinders are in their highest positions relative to the bodies thereof. Nitrogen 96 is then forced into the reservoirs 86, 88 until the pistons of the cylinders 32, 64, 66, 42 are moved 8 inches downward, the pressure raising the subframe portion 14 of vehicle 10 so that it is suspended on wheels 18, 20, 22.

It will be understood that a similar suspension system is associated with the subframe portion 12 so that the whole vehicle 10 is suspended.

If, as the vehicle 10 is moving, a sudden upward load is placed on wheel 18, as by hitting a bump, an increased pressure is set up in hydraulic cylinder 32, which pressure is communicated to hydraulic cylinder 64 through tube 80 by the fluid 94 therein. The increased pressure in hydraulic cylinder 64 is communicated to hydraulic cylinder 66 by linkage bar 58, acting as a lever about pin 56. The increased pressure in hydraulic cylinder 66 is communicated to hydraulic cylinder 42 through tube 82. It is to be noted that the areas of pistons 34 and 43 are equal, and that each has twice the area of the pistons 70 and 74. This means that if the load on piston 34 is increased by 100 pounds, the load on piston 70 is increased by 50 pounds. The increased force on piston 70 results in an increased force of 50 pounds on piston 74. This increased force of 50 pounds on piston 74, because of this area relationship, results in an increased force of 100 pounds on piston 43. It will thus be seen that the increase in force on each wheel is 100 pounds (100 pounds on piston 34, connected to wheel 18; 50 pounds on piston 70, 50 pounds on piston 74, both connected to wheel 20; and 100 pounds on piston 43, connected to wheel 22). Thus, if an increased load is placed on one of the wheels of the vehicle, the loads on the other wheels on that side of the vehicle are increased substantially the same amount.

It should be noted that the ends 58A, 58B of the linkage bar 58 are angled downward from the pin 56. As a force downward is placed on, for example, end 58A of linkage bar 58, and the linkage bar 58 pivots about pin 56, the lever arm defined between end 58A and pin 56 becomes shorter than the lever arm defined between end 58B and pin 56. This results in a force less than that on piston 70 being transferred to piston 74. This changing lever arm, in conjunction with the spring members 76, 78, insures that the vehicle 10 returns to a substantially level position. When such load on the wheel 18 is increased, as by hitting a bump, nitrogen in the reservoirs 86, 88 acts as a spring member to absorb the shock of the blow. The restrictive orifices 90, 92, act as shock dampers when a bump is hit by wheel 18.

It will be seen that herein is provided a hydraulic suspension system for a vehicle which is capable of providing load equalization over three wheels along one side of the vehicle. The system, as described, includes means for effectively absorbing shock and damping movement within it. The system is obviously quite simple and maintenance-free, and, it will be seen, can be applied quite easily to a variety of vehicles. The system has been found to be extremely advantageous because of the piston area relationship described. Because of such area relationship, it is ensured that proper load equalization over the wheels of the vehicle takes place.

We claim:

1. A suspension system associated with the frame of a vehicle for supporting one side of the frame above the ground comprising:
   a. first, second and third wheels disposed below the frame and rotatable about their respective axles;
   b. a first hydraulic cylinder disposed between and interconnecting the frame an and the axle of the first wheel;
   c. a second hydraulic cylinder disposed between and interconnecting the frame and the axle of the third wheel;
   d. a linkage bar the center portion of which is pivotally fixed relative to the axle of the second wheel;
   e. a third hydraulic cylinder disposed between and interconnecting the frame and one end of the linkage bar;
   f. a fourth hydraulic cylinder disposed between and interconnecting the frame and the other end of the linkage bar;
   g. a first tube interconnecting the first and third cylinders for the interchange of pressure therebetween; and
   h. a second tube interconnecting the second and fourth cylinders for the interchange of pressure therebetween.

2. A suspension system associated with the frame of a vehicle for supporting one side of the frame above the ground comprising:
   a. first, second and third wheels associated with the frame, the axles of the wheels being movable relative to the frame along lines substantially perpendicular to the ground;
   b. a first hydraulic cylinder the body of which is fixed relative to the frame above the axle of the first wheel and the piston of which is fixed relative to the axle of the first wheel to move therewith;
   c. a second hydraulic cylinder the body of which is fixed relative to the frame above the axle of the third wheel and the piston of which is fixed relative to the axle of the third wheel to move therewith;
   d. a linkage bar having its center portion pivotally fixed relative to and above the axle of the second wheel;
   e. a third hydraulic cylinder the body of which is fixed relative to the frame and above one end of the linkage bar and the piston rod of which is pivotally fixed relative to that one end of the linkage bar;
   f. a fourth hydraulic cylinder the body of which is fixed relative to the frame and above the other end of the linkage bar and the piston rod of which is pivotally fixed relative to that other end of the linkage bar;
   g. a first tube interconnecting the first and third hydraulic cylinder for the interchange of pressure therebetween; and
   h. a second tube interconnecting the second and fourth hydraulic cylinders for the interchange of pressure therebetween.

3. A suspension system according to claim 2 wherein the area of the piston of the first hydraulic cylinder is approximately twice the area of the piston of the third hydraulic cylinder, and the area of the piston of the second hydraulic cylinder is approximately twice the area of the piston of the fourth hydraulic cylinder.

4. A suspension system according to claim 3 wherein is further included a first reservoir disposed above and communicating with the first tube, and gaseous matter within the first reservoir, and a second reservoir disposed above and communicating with the second tube, and gaseous matter within the second reservoir.

5. A suspension system according to claim 4 and further including restrictive orifices in the first and second tubes where the first and second reservoirs communicate with the first and second tube respectively.

6. A suspension system associated with the frame of a vehicle for supporting a longitudinal side portion of the frame above the ground comprising:
   a. first, second and third wheels which are associated with the frame, the axles of the wheels being movable relative to the longitudinal side portion along lines substantially perpendicular to the ground, the first, second and third wheels being substantially aligned with the second wheel intermediate and equally spaced from the first and third wheels;

b. a first hydraulic cylinder the body of which is fixed relative to the longitudinal side portion above the axle of the first wheel and the piston of which is fixed relative to the axle of the first wheel to move therewith;

c. a second hydraulic cylinder the body of which is fixed relative to the longitudinal side portion above the axle of the third wheel and the piston of which is fixed relative to the axle of the third wheel to move therewith;

d. a linkage bar having its center portion pivotally fixed relative to and above the axle of the second wheel;

e. a third hydraulic cylinder the body of which is fixed relative to the longitudinal side member and above one end of the linkage bar and the piston rod of which is pivotally fixed relative to that one end of the linkage bar;

f. a fourth hydraulic cylinder the body of which is fixed relative to the longitudinal side member and above the other end of the linkage bar and the piston rod of which is pivotally fixed relative to that other end of the linkage bar;

g. a first tube interconnecting the first and third hydraulic cylinders for the interchange of pressure therebetween; and h. a second tube interconnecting the second and fourth hydraulic cylinders for the interchange of pressure therebetween.

7. A suspension system according to claim 6 wherein the areas of the piston of the first and second hydraulic cylinders are approximately equal, the area of the piston of the first hydraulic cylinder is approximately twice the area of the piston of the third hydraulic cylinder, and the area of the piston of the second hydraulic cylinder is approximately twice the area of the piston of the fourth hydraulic cylinder.

8. A suspension system according to claim 7 and further including a first reservoir disposed above and communicating with the first tube, and gaseous matter within the first reservoir, and a second reservoir disposed above and communicating with the second tube, and gaseous matter within the second reservoir, and further including restrictive orifices where the first and second reservoirs communicate with the first and second tubes respectively.